United States Patent [19]

Milford, Jr.

[11] Patent Number: 4,460,763

[45] Date of Patent: Jul. 17, 1984

[54] PREPARATION OF SMALL PARTICLE POLYBENZIMIDAZOLE

[75] Inventor: George N. Milford, Jr., Waynesboro, Va.

[73] Assignee: E. I. DuPont de Nemours and Company, Wilmington, Del.

[21] Appl. No.: 484,556

[22] Filed: Apr. 13, 1983

Related U.S. Application Data

[62] Division of Ser. No. 290,865, Aug. 7, 1981, Pat. No. 4,394,500.

[51] Int. Cl.$^3$ .............................................. C08G 73/18
[52] U.S. Cl. .................................... 528/336; 528/342
[58] Field of Search ................................. 528/342, 336

[56] References Cited

U.S. PATENT DOCUMENTS 3,313,783  4/1967  Iwakura et al. ..................... 528/342

Primary Examiner—Harold D. Anderson

[57] ABSTRACT

Polybenzimidazoles are prepared in the form of small particles by reaction of bis(o-diamine) substituted compounds with dicarboxylic acids or of o-diamino-substituted carboxylic acids in the presence of an inert, nonsolvent, liquid medium and polyphosphoric acid.

4 Claims, No Drawings

PREPARATION OF SMALL PARTICLE POLYBENZIMIDAZOLE

This application is a divisional application of application Ser. No. 290,865 filed Aug. 7, 1981 now U.S. Pat. No. 4,394,500.

This invention relates to an improved process for the preparation of polybenzimidazoles, wherein the starting material is polymerized smoothly to high molecular weight in a manner so that the product is obtained in the form of small particles.

BACKGROUND OF THE INVENTION

Polybenzimidazoles are a class of polymers characterized by a high degree of thermal stability.

The preparation of poly[2,5(6)-benzimidazole],

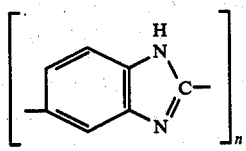

by heating phenyl 3,4-diaminobenzoate has been described by Marvel et al. in Example 1 of U.S Pat. No. 3,174,947 (Reissue No. 26,065). This reference also describes the preparation of other polybenzimidazoles from various o-diaminocarboxylic acids in the form of their phenyl esters, as well as from mixtures of monomers in which one compound contains a pair of o-diaminoaryl substituents and the other compound is a diphenyl ester of an aromatic dicarboxylic acid.

Japanese Patent Application No. 18,352/67, describes a process for preparing poly [2,5(6)-benzimidazole] by heating 3,4-diaminobenzoic acid in the presence of polyphosphoric acid. Although it is desirable from a commercial viewpoint to prepare the polymer directly from 3,4-diaminobenzoic acid, rather than from its phenyl ester, it has been found difficult to reduce the bulk polymer so prepared to the small particles required for dissolution. It would be desirable for the polymeric product to be prepared in the form of small paticles so that polyphosphoric acid and other impurities could be easily removed and the particles easily dissolved to low solutions suitable for extrusion into shaped articles. A further problem is that the reaction mass employed in this process is quite corrosive towards conventional steel reaction vessels, and a less corrosive process would be desirable.

Polybenzimidazoles may be prepared in the form of fibers and other shaped articles which are flame resistant and which can be used for many purposes in high-temperature environments. For instance, polybenzimidazole fibers are suitable for use in making filter bags for removal of particles from hot stack gases, owing to the stability of the fibers in hot acidic environments.

BRIEF DESCRIPTION OF THE INVENTION

This invention provides a process for the preparation of polybenzimidazoles in the form of small particles from aromatic compounds selected from the group consisting of:

(A) a bis(o-diamino) substituted compound and a dicarboxylic acid compound, and (B) an o-diamino-substituted carboxylic acid compound, compounds (A) if used being present in approximately equimolar amounts, by reaction in the presence of polyphosphoric acid wherein compounds (A) and/or (B) are combined in an inert, nonsolvent, liquid medium with polyphosphoric acid and heated to 120°-230° C. with stirring for 1-4 hours, cooled to room temperature with continued stirring, filtered to remove polybenzimidazole and washed to remove impurities. Preferably the inert, nonsolvent, liquid medium is mineral oil. Preferably a surface active agent is present in the reaction mixture. Preferably aromatic compounds of type (B) are used. Most preferably the aromatic compound is 3,4-diaminobenzoic acid. Preferably the reaction is carried out at 120°-200° C. for two hours.

DETAILED DESCRIPTION OF THE INVENTION

The reactants (A) and/or (B) are heated and agitated in the liquid inert medium with polyphosphoric acid to keep the finely divided mixture suspended until reactants (A) and/or (B) are polymerized to a polybenzimidazole. The reaction mixture is cooled with continued stirring and the polybenzimidazole is separated in the form of small particles from the liquid inert medium. The orthodiamino substituent comprises two amino groups attached on an aromatic nucleus in an ortho relationship and is counted as a single substituent. Thus, the aromatic compounds may comprise (a) a mixture of at least one aryldicarboxylic acid compound or anhydride thereof with at least one bis(o-diamino) compound, (b) a single o-diaminoarylcarboxylic acid compound or (c) a mixture containing compounds from both (a) and (b). Compounds (b) if used are present in approximately equimolar amounts.

In a preferred embodiment of the invention, a mixture of polyphosphoric acid and 3,4-diaminobenzoic acid is physically suspended in an inert, nonsolvent, liquid medium and heated and agitated until the mixture is suspended as a finely divided mixture in the liquid medium; heated with continued agitation until the 3,4-diaminobenzoic acid is converted to poly[2,5(6)benzimidazole] the liquid inert medium is cooled; and poly[2,5(6)-benzimidazole] is separated in the form of small particles from the liquid inert medium.

When the polymerization is completed, agitation of the liquid inert medium should be continued while the medium is being cooled. The liquid inert medium is preferably a mineral oil. A surface active agent may also be included in the reaction mixture.

By polyphosphoric acid is meant approximately 115% orthophosphoric acid, i.e., orthophosphoric acid having a $P_2O_5$ content of approximately 83% by weight.

When the polymerization is carried out using mineral oil, after removal of polybenzimidazole by filtration, the polybenzimidazole particles may be washed with a low-boiling hydrocarbon solvent to remove residual mineral oil and then dissolved in 90-100%, preferably 100%, orthophosphoric acid to form a solution suitable for spinning into fibers or coating into film. Alternatively, 98-100% sulfuric acid may be used to form solutions suitable for forming shaped articles.

The inherent viscosity of the polymer is determined by obtaining viscosimeter flow times at 25.0°±0.1° C. for concentrated sulfuric acid (95-98%) and for a solution of the polymer in the concentrated sulfuric acid at a concentration of 0.5 gram per 100 milliliters of solution. The relative viscosity is calculated by dividing the flow time of the solution by the flow time of the concentrated sulfuric acid. The inherent viscosity of the polymer is then calculated as 2 times the natural logarithm of the relative viscosity.

The following examples illustrate the invention.

EXAMPLE 1

To a clean, dry, nitrogen-swept, 3-necked, 200-ml glass flask equipped with a mechanical stirrer are added:
  13.0 g of 3,4-diaminobenzoic acid
  100 ml of white mineral oil
  1 g of an amine dodecylbenzenesulfonate surface-active agent.

The mixture is stirred well and 55.4 g of polyphosphoric acid is added with stirring. It is observed that a large lump is formed in the flask. The flask is heated slowly, and it is observed that at about 120° C. the lump breaks up into small particles. The mixture is then heated further to 200° C., and held at this temperature for two hours with continued stirring, forming a grayish-black product. When the mixture is cooled, most of the product is in the form of small beads, which are readily removed from the mixture by filtration. The beads, which are hard and tough, are designated as part A of the product. The remainder of the product, designated as part B, is in the form of material stuck to the sides of the flask. Both parts of the product are separately extracted with water, neutralized with sodium bicarbonate, filtered, washed with water and then with acetone, and finally dried 7 hours at 110° C. in a vacuum oven. Part A of the product weighs 16.32 g and has an inherent viscosity of 1.37. Part B of the product weighs 1.09 g and has an inherent viscosity of 1.60.

A 5.0 g portion of the beads of part A of the product is placed in a 50-ml portion of 100% sulfuric acid and the mixture is heated and stirred, whereupon a solution is obtained. The solution is poured slowly into 500 ml of water and the resulting solid removed by filtration, suspended in water, neutralized with sodium bicarbonate, removed by filtration, washed many times with water, washed with acetone, dried over a steam bath, and finally further dried in a vacuum oven at 110° C. The dry weight of the recovered solid product is 3.0 g, and its inherent viscosity is 1.90.

EXAMPLE 2

Using the equipment described in Example 1, the following ingredients are added to the flask:
  6.5 g of 3,4-diaminobenzoic acid
  27.7 g (13.8 ml) of polyphosphoric acid
  100 ml of white mineral oil
  1 g of an amine dodecylbenzenesulfonate surface-active agent.

The reaction is initiated by heating the mixture slowly to 130° C. with rapid stirring. The mixture is heated further to 200° C. and held at this temperature for 2 hours with continued stirring. The mixture is cooled and the product removed by filtration and washed with hexane. This portion of the product, which is in the form of small beads which are very hard and tough, is designated as part A. A small additional quantity of product at the top of the flask is removed, washed with hexane, and designated as part B. Both parts are suspended in water, neutralized with sodium bicarbonate, removed by filtration, washed with water and then with acetone, and finally dried at 110° C. in a vacuum oven. Part A of the product, comprising 5.18 g (70.3% of the total) consists of small beads and has an inherent viscosity of 1.52. Part B of the product, comprising 2.20 g (29.7% of the total) is in the form of powder and has an inherent viscosity of 1.84.

EXAMPLE 3

A higher concentration of the surface-active agent is employed in this example. The equipment used is the same as that used in Example 1. The following ingredients are added to the flask:
  6.5 g of 3,4-diaminobenzoic acid
  100 ml of white mineral oil
  1.5 g of an amine dodecylbenzenesulfonate surface-active agent.

The mixture is stirred well and 27.7 g of polyphosphoric acid is added in small portions. The mixture is then heated to a temperature of 200°–210° C. with stirring, and held for 2 hours at that temperature. When the mixture is cooled, it is observed that the product is in the form of particles larger than those observed in Example 1. The product is removed by filtration and placed in a beaker. The small amount of solid remaining in the flask is dissolved in 14 ml of hot 100% sulfuric acid and poured into the beaker over the solid product already there, after which the mixture is allowed to stand overnight. It is observed that additional mineral oil has separated, and this is decanted from the very viscous acid solution. The acid solution is then heated and an additional 25 ml of 100% sulfuric acid is added. The solution is then poured slowly into water and the precipitated polymer removed by filtration, washed with water and dried. The dry weight of the product is 6.44 g having an inherent viscosity of 1.25.

EXAMPLE 4

The work reported in this example, in which no surface-active agent is added to the reaction mixture, is carried out in the equipment used in Example 1. The following ingredients are added to the flask:
  13.0 g of 3,4-diaminobenzoic acid
  100 ml of white mineral oil.

To the well-stirred mixture is added, drop-wise from a small dropping pipette, 60 g of polyphosphoric acid, the reaction mixture is heated slowly to 200° C., whereupon a large mass surrounded by clear fluid is formed. The mass breaks into flat chips ranging in size from small flat particles to chips of about 1 cm long. After 2 hours, the mixture is cooled to room temperature with continued stirring and the solid particles are removed by filtration and washed with hexane. The product weighs 17.58 g and has an inherent viscosity of 1.32. An additional 1.36 g of product is obtained from the walls of the flask, washed well with water and then acetone and then dried under vacuum at 110° C. The additional product has an inherent viscosity of 1.96.

A 6.18 g portion of the product in the form of loose chips is dried for 2 days at 125° C. under high vacuum. The dried product weighs 5.95 g, thus showing little weight loss. Another 11.29 g portion of this product is dissolved in 75 ml of 100% sulfuric acid, and then precipitated in 400 ml of water, filtered, washed with water until the filtrate is free of acid, washed with acetone, and dried at 125° C. under high vacuum for 16 hours. The weight of dry product is 6.62 g and is believed to be free of phosphoric acid. The inherent viscosity of the reprecipitated product is 2.07.

I claim:

1. A process for preparing small particles of polybenzimidazole comprising heating at a temperature of 120°–230° C. for a time of 1–4 hours, with stirring, a reaction mixture comprising equimolar amounts of a bis(o-diamino) substituted organic compound and a dicarboxylic organic compound, an inert nonsolvent liquid medium, and a polyphosphoric acid suspending agent, to produce a composition comprising polybenzimidazole, cooling said composition to room temperature with stirring to precipate small particles of polybenzimidazole, filtering and washing the polybenzimidazole small particles.

2. The process of claim 1, wherein the inert, nonsolvent, liquid medium is mineral oil.

3. The process of claim 2 wherein the reaction mixture contains a surface-active agent.

4. The process of claim 3 wherein the temperature is 120°–200° C. and the time is two hours.

* * * * *